United States Patent [19]

Park et al.

[11] Patent Number: 5,543,493

[45] Date of Patent: Aug. 6, 1996

[54] METHOD FOR TREATING A POLYIMIDE SURFACE

[75] Inventors: Chan-eon Park; Hwang-kyu Yun, both of Kyungsangbuk-do; Sung-min Sim, Suwon; Wan-gyun Choi, Kyungki-do, all of Rep. of Korea

[73] Assignee: Samsung Electronics Co., Ltd., Kyungki-do, Rep. of Korea

[21] Appl. No.: 280,769

[22] Filed: Jul. 26, 1994

[30] Foreign Application Priority Data

Apr. 11, 1994 [KR] Rep. of Korea ............... 19947534

[51] Int. Cl.⁶ .................................................. B05D 3/10
[52] U.S. Cl. .................. 528/353; 427/371; 427/372.2; 427/430.1; 427/337
[58] Field of Search .................. 427/337, 371, 427/372.2, 430.1; 528/353

[56] References Cited

U.S. PATENT DOCUMENTS

| | | | |
|---|---|---|---|
| 3,971,708 | 7/1976 | Davis et al. | 204/181 |
| 4,555,414 | 11/1985 | Hoover et al. | 430/417 |
| 4,666,735 | 5/1987 | Hoover et al. | 430/417 |
| 4,842,946 | 6/1989 | Foust et al. | 428/458 |
| 4,959,121 | 9/1990 | Dumas et al. | 156/668 |
| 5,084,345 | 11/1992 | Manos | 428/335 |
| 5,096,998 | 3/1992 | Manos | 528/179 |
| 5,116,637 | 5/1992 | Baney et al. | 427/340 |
| 5,135,815 | 8/1992 | Manos | 428/458 |
| 5,152,863 | 10/1992 | Manos | 156/331.5 |
| 5,262,041 | 11/1993 | Gulla | 205/125 |
| 5,272,245 | 12/1993 | Manos | 208/353 |
| 5,391,397 | 2/1995 | Makerji | 427/207.1 |

*Primary Examiner*—Samuel A. Acquah
*Assistant Examiner*—P. Hampton-Hightower
*Attorney, Agent, or Firm*—Cushman Darby & Cushman, L.L.P.

[57] ABSTRACT

A method for treating a polyimide surface which includes the steps of amine-treating the polyimide surface and drying the thusly amine-treated polyimide surface. The amine-treating step is preferably carried out by immersing the polyimide in an amine solution which includes an amine and a solvent. The amine is preferably an aliphatic, aromatic, or siloxane amine. The drying step is preferably carried out a temperature of about 50°–200° C. The polyimide is preferably a polyimide having at least one imide functional group in its main chain, and is most preferably a polycondensate of at least one dianhydride and at least one diamine.

20 Claims, 2 Drawing Sheets

METHOD FOR TREATING A POLYIMIDE SURFACE

BACKGROUND OF THE INVENTION

The present invention relates generally to a method for treating a polyimide surface, and, more particularly, to a method for treating a polyimide surface using amines.

Polyimide has a small coefficient of thermal expansion and a small dielectric constant, and exhibits good heat resistance and dimensional stability, and is widely used as a composite material, an adhesive, and a coating material. These polyimide characteristics of good heat resistance, low dielectric constant, and good mechanical properties make polyimide particularly useful as a dielectric or protective layer in semiconductor devices, e.g., in semiconductor memory devices such as DRAMs and SRAMs. In such applications, the polyimide preferably interfaces with metals, ceramics, and polymers such as epoxy molding compounds. Therefore, the adhesion of polyimide to these materials is an important factor with respect to the reliability of semiconductor devices.

Generally, polyimide is formed by synthesizing polyamic acid, a precursor of polyimide, by polymerizing dianhydride with diamine in a solvent. The polyamic acid is transformed into polyimide by means of a dehydration process, which is carried out by means of application of heat and/or by means of a dehydrant.

PMDA-ODA (pyromellitic dianhydride-4,4'-oxydianiline) polyimide exhibits poor adhesion to silicon wafers. Epoxy resin/PMDA-ODA or epoxy molding compound/PMDA-ODA exhibit such poor adhesion that spontaneous peeling occurs. Consequently, extensive research & development has been devoted to improving such poor adhesion. A first method which has been proposed is directed to changing the chemical structure of the main chain of the polyimide using a co-monomer such as BTDA (benzophenone tetracarboxyl dianhydride) or GAPDS (bis (γ-aminopropyl) tetramethyldisiloxane), to thereby form a copolymerized polyimide. A second method which has been proposed is directed to plasma treatment of the polyimide. A third method which has been proposed is directed to wet surface treatment of the polyimide, in which the imide functional group of the polyimide is hydrolzyed into amic acid by treating the polyimide with aqueous sodium hyrodxide (or aqueous potassium hydroxide) solution and then with an aqueous hydrochloric acid solution.

Although the above-described proposed methods improve the adhesion of polyimide to silicon, epoxy resin, and other materials, they still suffer from the following drawbacks and shortcomings. Namely, copolymerized polyimide exhibits a decrease in heat resistance as compared with PMDA-ODA without a co-monomer. Wet surface treatment of polyimide in an alkali solution takes a relatively long time, and subjects metal lines of the semiconductor device to corrosion by hydroxide ions left on the polyimide surface.

Based on the above, it can be appreciated that there presently exists a need in the art for a method of treating a polyimide surface which overcomes the above-described drawbacks and shortcomings of the presently available methods of treating a polyimide surface. The present invention fulfills this need.

SUMMARY OF THE INVENTION

An object of the present invention is to provide a method of treating a polyimide surface which improves the adhesion characteristics of the polyimide.

Another object of the present invention is to provide a method of treating a polyimide surface which improves the adhesion between the polyimide and an epoxy resin or an epoxy resin molding compound.

An additional object of the present invention is to provide a method of treating a polyimide surface which maintains the bulk characteristics of the polyimide while avoiding ion contamination during wet surface treatment thereof.

The above and other objects of the present invention are accomplished by a method for treating a polyimide surface which includes the steps of amine-treating the polyimide surface and drying the thusly amine-treated polyimide surface. The amine-treating step is preferably carried out by immersing the polyimide in an amine solution which includes an amine and a solvent. The amine is preferably an aliphatic, aromatic, or siloxane amine. The drying step is preferably carried out a temperature of about 50°–200° C. The polyimide is preferably a polyimide having at least one imide functional group in its main chain, and is most preferably a polycondensate of at least one dianhydride and at least one diamine.

BRIEF DESCRIPTION OF THE DRAWINGS

These and various other objects, features, and advantages of the present invention will be readily understood with reference to the following detailed description taken in conjunction with the accompanying drawings, wherein like reference numerals designate like structural elements, and, in which.

DETAILED DESCRIPTION OF THE INVENTION

Figure 1A:
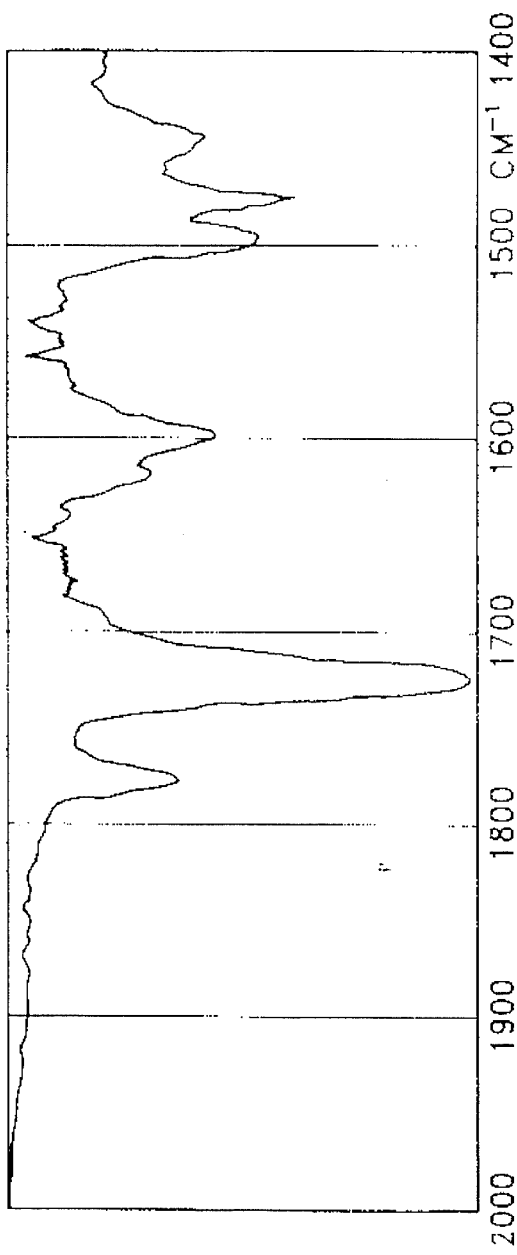
FIG. 1A depicts the imide spectrum of a polyimide surface which was amine-treated in accordance with a preferred embodiment of the present invention.

In accordance with the present invention, a polyimide surface is treated with an amine in order to improve the adhesion characteristics of the polyimide, without ion contamination of the polyimide surface. In accordance with a preferred embodiment of the present invention the polyimide is immersed in an amine solution which consists of an amine and a solvent, and then drying the amine-treated polyimide. In a specifically preferred embodiment of the present invention, the polyimide is immersed in an amine solution consisting of 0.1–0.3 g of the amine dissolved in about 100 ml of solvent for approximately 1–40 minutes and then dried (reaction proceeds) in a drying oven at about 50°–200° C. for about one hour.

In a preferred embodiment of the present invention, the polyimide contains at least one imide functional group in its main chain. Suitable polyimides include polyetherimides. Preferred polyimides are polycondensates of at least one dianhydride and at least one diamine. Suitable dianhydrides include pyromellitic dianhydride (PMDA), diphenylsulfone dianhydride (DSDA), benzophenone tetracarboxyl dianhydride (BTDA), hexafluoroisopropylidene-bis (phthalic dianhydride) (6 FDA), biphenyltetracarboxyl dianhydride (BPDA), and oxydiphthalic anhydride (ODPA). Suitable diamines include oxydianiline (ODA), methylene dianiline (MDA), m-phenylene diamine (MPDA), 2,6-diamino pyridine (DAP), 3,3-diaminobenzophenone (DABP), p-phenylene diamine (PPDA), diamino phenyl indane (DAPI), bis (aminophenoxy) benzene (APB), and bis (γ-aminopropyl) tetramethyldisiloxane (GAPDS).

In a specifically preferred embodiment of the present invention, the polyimide was formed by coating an aluminum foil with polyamic acid (the precursor of polyimide) and then heating the polyamic acid-coated aluminum foil in an oven, gradually increasing the temperature to at least 300° C., or, alternatively, by coating the aluminum foil with polyetherimide (PEI), e.g., polyetherimide sold under the General Electric trademark Ultem 1000, dissolved in methylene chloride and then drying the coated aluminum foil in a drying oven.

Preferred amines for treating the polyimide surface include aliphatic, aromatic and siloxane amines. Suitable aliphatic amines include tetramethylammonium hydroxide (TMAH), tetrabutylammonium hydroxide (TBAH), N-methyl-1,3- propanediamine (NPDA), hydrazine (HA), ethylenediamine (EDA), 1,3- propanediamine (PDA), 1,4-butanediamine (BDA), 1,6-hexanediamine (HDA), diethylenetriamine (DETA), triethylenetetramine (TETA), tetraethylenepentamine (TEPA), and pentaethylenehexamine (PEHA). Suitable aromatic amines include oxydianiline (ODA), methylenedianiline (MDA), m-phenylene diamine (MPDA), p-phenylenediamine (PPDA), 2,6-diaminopyridine (DAP), 3,3-diaminobenzophenone (DABP), and bis (aminophenoxy) benzene (APB). A suitable siloxane amine is bis (7-aminopropyl) tetramethyldisiloxane (GAPDS).

Preferred solvents for use with aliphatic amines include distilled water, methyl alcohol, and isopropyl alcohol, or any combination thereof. A preferred solvent for use with aromatic amines is N-methyl pyrrolidone (NMP). A preferred solvent for use with siloxane amines is tetrahydrofuran (THF).

With the method of the present invention, the amine reacts with an imide functional group of the polyimide to produce amic amide. This phenomenon was confirmed by FT-IR spectroscopy, as described below.

Figure 1B:
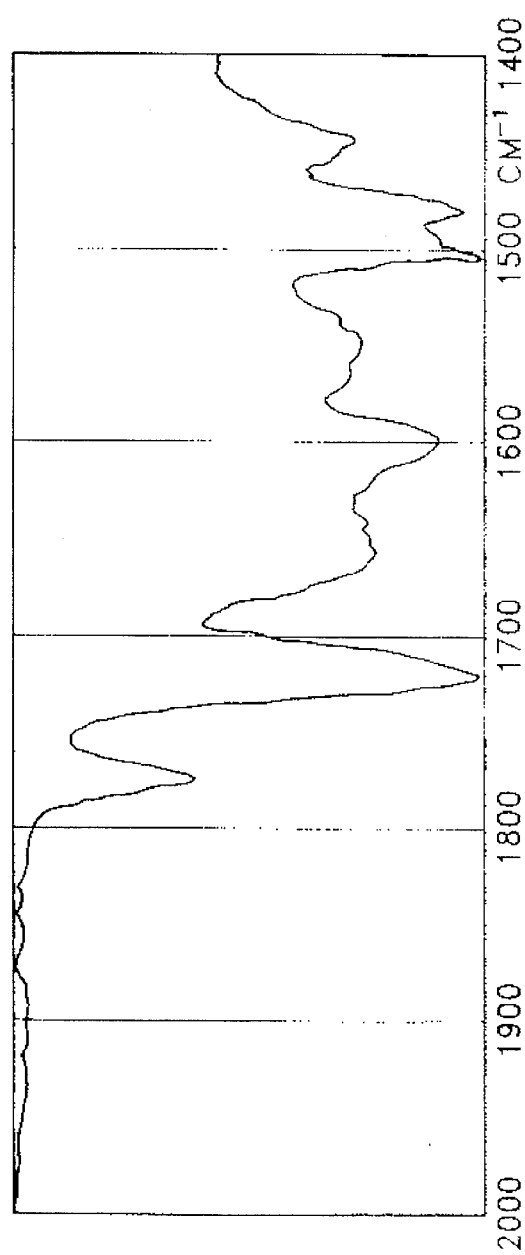
FIG. 1B depicts the amide spectrum of the same polyimide surface as in FIG. 1 A; and, FIG. 2 is a graph which depicts the adhesion (peel) strength (to epoxy resin) of a polyimide surface amine-treated in accordance with another preferred embodiment of the present invention, as a function of drying temperature.

More particularly, the spectra of the reaction product obtained by mixing polyetherimide and TETA in methylene chloride and drying the mixture at 100° C. was measured by means of FT-IR spectroscopy. FIG. 1A depicts the imide spectrum of the dried mixture, and FIG. 1B depicts the amide spectra of the dried mixture. As can be seen in FIG. 1A, the imide peaks occur at depths of 1780 cm$^{-1}$ and 1720 cm$^{-1}$. As can be seen in FIG. 1B, the amide peaks occur at depths of 1660 cm$^{-1}$ and 1540 cm$^{-1}$, thus confirming that amic amide is produced by an imide-amide reaction.

The strength of adhesion of a polyimide surface amine-treated in accordance with the present invention (hereinafter referred to as the amine-treated polyimide surface), to an o-cresol novolac type of epoxy resin or commercial grade epoxy molding compound, was measured, for various different examples of the present invention described below.

For this adhesion strength testing, the epoxy resin or epoxy molding compound was adhered to the amine-treated polyimide surface. Nadic methyl anhydride (NMA) was used as the curing agent, and benzyl dimethyl amine was used as the curing catalyst. The epoxy resin and curing agent were mixed in a chemical equivalent ratio, and the mixing amount of the curing catalyst was 2% of the resin weight. The epoxy resin mixture was cured for two hours at 90° C. and then for four hours at 90°–180° C. The commercial grade epoxy molding compound was adhered to the amine-treated polyimide surface by transfer molding for two minutes at 175° C., with post-curing being carried out for six hours at 175° C.

The adhesion strength of the epoxy resin or epoxy molding compound to the amine-treated polyimide surface was measured using a 90° peel test, which was performed by peeling the polyimide from the epoxy resin or epoxy molding compound, with the adhesion strength being expressed in terms of peel strength, in units of kN/m.

EXAMPLE 1

PMDA-ODA polyamic acid was imidized at 100° C., at 200° C., and at 300° C. for one hour at each temperature. The imidized PMDA-ODA was then immersed in an isopropyl alcohol solution of 0.5 w/v% TETA for 5 minutes. The thusly amine-treated PMDA-ODA was then dried at 150° C. for one hour. The above-described 90° peel test was performed on a PMDA-ODA sample which was not amine-treated and with a PMDA-ODA sample which was amine-treated in the above-described manner. The amine-treated PMDA-ODA exhibited an adhesion strength of 0.90±0.06 kN/m with respect to epoxy resin, and the untreated PMDA-ODA exhibited an adhesion strength of 0.02±0.0001 kN/m with respect to epoxy resin.

EXAMPLE 2

PMDA-ODA was imidized in the same manner as in Example 1. The imidized PMDA-ODA was then immersed in a 0.5 w/v% aqueous NPDA solution for 5 minutes. The thusly amine-treated PMDA-ODA was then dried at 80° C. for one hour, and its adhesion strength to epoxy resin tested, and determined to be 0.48±0.03 kN/m.

EXAMPLE 3

PMDA-ODA was imidized in the same manner as in Example 1. The imidized PMDA-ODA was then immersed in a 0.5 w/v% aqueous TMAH solution for 5 minutes. The thusly amine-treated PMDA-ODA was then dried at 150° C. for one hour, and its adhesion strength to epoxy resin tested, and determined to be 0.34±0.02 kN/m.

EXAMPLE 4

PMDA-ODA was imidized in the same manner as in Example 1. The imidized PMDA-ODA was then immersed in a 0.5 w/v% aqueous TBAH solution for 5 minutes. The thusly amine-treated PMDA-ODA was then dried at 150° C. for one hour, and its adhesion strength to epoxy resin tested, and determined to be 0.08±0.01 kN/m.

EXAMPLE 5

Various samples of PMDA-ODA were imidized in the same manner as in Example 1. Additionally, several samples of PEI (Ultem 1000) were imidized by immersing 10 g of each PEI sample in 100 ml of methylene chloride, and then drying the thusly imidized PEI samples at 150° C. for one hour. The various samples of both the imidized PMDA-ODA and PEI were then immersed in a 0.5 w/v% aqueous amine solution of HA, EDA, PDA, BDA, and HDA, respectively, for 5 minutes each. The thusly-amine treated samples of the PMDA-ODA and PEI were then each dried at 80° C. for one hour. Then, the adhesion strength of each amine-treated PMDA-ODA and PEI sample with respect to epoxy resin was tested and measured. The thusly measured adhesion strength of each of the respective samples of PMDA-ODA and PEI are shown in Table 1 below (the unit of adhesion strength being kN/m).

TABLE 1

| amine | PMDA - ODA | PEI |
|---|---|---|
| HA | 0.12 ± 0.04 | 0.03 ± 0.001 |
| EDA | 0.20 ± 0.06 | 0.07 ± 0.04 |
| PDA | 0.22 ± 0.02 | 0.31 ± 0.03 |
| BDA | 0.39 ± 0.06 | 0.34 ± 0.04 |
| HDA | 0.33 ± 0.02 | 0.38 ± 0.11 |

The aliphatic diamines HA, EDA, PDA, BDA, and HDA are listed in Table 1, from top to bottom, in ascending order of the distance between the diamines thereof. Thus, it can be clearly appreciated by reference to Table 1, that the adhesion strength of both the amine-treated PMDA-ODA and PEI increases as the distance between the diamines of the aliphatic diamines increases.

EXAMPLE 6

Various samples of PMDA-ODA were imidized in the same manner as in Example 1. Each of the imidized PMDA-ODA samples was then immersed in a different 0.5 w/v% aqueous aliphatic polyamine solution for 5 minutes, and then dried at 80° C. for one hour. The different aliphatic polyamines which were employed were TETA, TEPA and PEHA. The adhesion strength (to epoxy resin) of the TETA-, TEPA-, and PEHA- treated PMDA-ODA samples was then measured, and determined to be 0.73±0.04 kN/m, 0.69±0.04 kN/m, and 0.61±0.08 kN/m, respectively.

Figure 2:
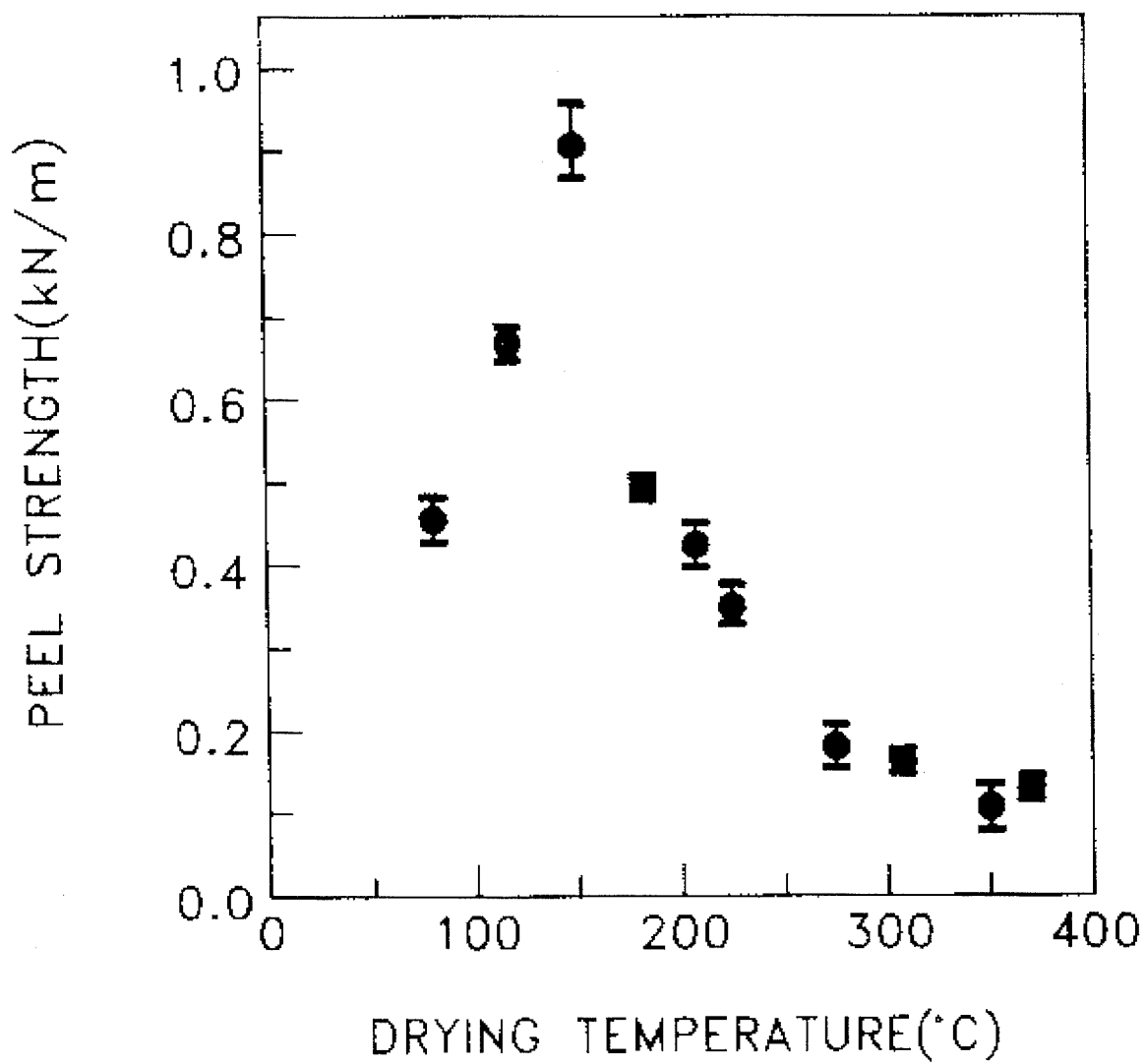

With reference now to FIG. 2, there can be seen a graph which depicts the adhesion (peel) strength (to epoxy resin) of TETA-treated PMDA-ODA at various drying temperatures, with a constant drying time of one hour. As can be clearly seen with reference to FIG. 2, the adhesion strength of the TETA-treated PMDA-ODA increases as the drying temperature increases to 150° C. and decreases beyond this point. In light of this finding, it is believed that the adhesion mechanisms are the cross-linking of adjacent polyimide chains by the diamine or polyamine, and the chemical bonding of an epoxide functional group with amine at the polyimide-epoxy resin interface.

Because of the low basicity of the amine solution employed in accordance with the present invention, corrosion of metal lines of a semiconductor device having a polyimide surface amine-treated in accordance with the method of the present invention does not occur.

Although the present invention has been described in detail hereinabove, it should be clearly understood that many variations and/or modifications of the basic inventive concepts herein taught which may appear to those skilled in the pertinent art will still fall within the spirit and scope of the present invention as defined in the appended claims.

What is claimed is:

1. A method for treating a surface of a polyimide, comprising the steps of:

amine-treating said polyimide surface by immersing said polyimide surface in an amine solution which includes an amine selected from the group consisting of aliphatic amine, aromatic amine and siloxane amine, and a solvent; and drying said amine-treated polyimide surface.

2. The method as set forth in claim 1, wherein said polyimide is a polyimide having at least one imide functional group in its main chain.

3. The method as set forth in claim 2, wherein said polyimide is a polyetherimide.

4. The method as set forth in claim 2, wherein said polyimide is a polycondensate of at least one dianhydride and at least one diamine.

5. The method as set forth in claim 4, wherein said at least one dianhydride is a dianhydride(s) selected from a group consisting of pyromellitic dianhydride (PMDA), diphenylsulfone dianhydride (DSDA), benzophenone tetracarboxyl dianhydride (BTDA), hexafluoroisopropylidene-bis (phthalic dianhydride) (6 FDA), biphenyltetracarboxyl dianhydride (BPDA), and oxydiphthalic anhydride (ODPA).

6. The method as set forth in claim 5, wherein said at least one diamine is a diamine(s) selected from the group consisting of oxydianiline (ODA), methylene dianiline (MDA), m-phenylene diamine (MPDA), 2,6-diamino pyridine (DAP), 3,3'-diaminobenzophenone (DABP), p-phenylene diamine (PPDA), diamino phenyl indane (DAPI), bis (aminophenoxy) benzene (APB), and bis (γ-aminopropyl) tetramethyldisiloxane (GAPDS).

7. The method as set forth in claim 1, wherein said solvent is a solvent selected from the group consisting of methyl alcohol, isopropyl alcohol, distilled water, N-methyl pyrrolidone (NMP), and tetrahydrofuran (THF).

8. The method as set forth in claim 1, wherein:

said amine is an aliphatic amine; and, said solvent is a solvent selected from the group consisting of distilled water, methyl alcohol, and isopropyl alcohol.

9. The method as set forth in claim 8, wherein said aliphatic amine is an aliphatic amine selected from the group consisting of tetramethylammonium hydroxide (TMAH), tetrabutylammonium hydroxide (TBAH), N-methyl-1,3-propanediamine (NPDA), hydrazine (HA), ethylenediamine (EDA), 1,3-propanediamine (PDA), 1,4- butanediamine (BDA), 1,6-hexanediamine (HDA), diethylenetriamine (DETA), triethylenetetramine (TETA), tetraethylenepentamine (TEPA), and pentaethylenehexamine (PEHA).

10. The method as set forth in claim 1, wherein:

said amine is an aromatic amine; and, said solvent is N-methyl pyrrolidone (NMP).

11. The method as set forth in claim 10, wherein said aromatic amine is one selected from the group consisting of oxydianiline (ODA), methylenedianiline (MDA), m-phenylene diamine (MPDA), p-phenylenediamine (PPDA), 2,6-diaminopyridine (DAP), 3,3'-diaminobenzophenone (DABP), and bis (aminophenoxy) benzene (APB).

12. The method as set forth in claim 1, wherein:

said amine is a siloxane amine; and, said solvent is tetrahydrofuran (THF).

13. The method as set forth in claim 12, wherein said siloxane amine is bis (γ-aminopropyl) tetramethyldisiloxane (GAPDS).

14. A method for treating a surface of a polyimide, said polyimide is prepared by imidizing (pyromellitic dianhydride- 4,4'-oxydianiline) polyimide polyamic acid at 100° C., 200° C., and 300° C., for one hour at each temperature, the method comprising the steps of:

amine-treating said polyimide surface by immersing said polyimide surface in an isopropyl alcohol solution of 0.5 w/v% TETA.

15. The method as set forth in claim 14, wherein: said amine-treating step is carried out for 5 minutes; and, said drying step is carried out at 150° C. for one hour.

16. A method for amine-treating a surface of a polyimide, comprising the steps of:

amine-treating said polyimide surface by immersing said polyimide surface in a 0.5 w/v% aqueous amine solution which includes an amine and a solvent; and, drying said amine-treated polyimide surface.

17. The method as set forth in claim 16, wherein said amine is an aliphatic amine.

18. The method as set forth in claim 17, wherein: said amine-treating step is carried out for 5 minutes; and, said drying step is carried out at 80°–150° C. for one hour.

19. The method as set forth in claim 16, wherein said polyimide is prepared by imidizing PDMA-ODA.

20. The method as set forth in claim 16, wherein said polyimide is a polyetherimide.

* * * * *